United States Patent
Xiong et al.

(10) Patent No.: US 10,888,993 B2
(45) Date of Patent: Jan. 12, 2021

(54) ASSEMBLY FOR DRIVING WAIST OF ROBOT AND ROBOT HAVING THE SAME

(71) Applicant: UBTECH Robotics Corp, Shenzhen (CN)

(72) Inventors: Youjun Xiong, Shenzhen (CN); Gao Yang, Shenzhen (CN); Defu Liu, Shenzhen (CN); Zuyi Mao, Shenzhen (CN); Xinpu Chen, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 33 days.

(21) Appl. No.: 16/285,192

(22) Filed: Feb. 25, 2019

(65) Prior Publication Data

US 2020/0180146 A1 Jun. 11, 2020

(30) Foreign Application Priority Data

Dec. 11, 2018 (CN) .......................... 2018 1 1512103

(51) Int. Cl.
*B25J 9/12* (2006.01)
*G05G 5/04* (2006.01)
*B25J 9/00* (2006.01)

(52) U.S. Cl.
CPC ............ *B25J 9/126* (2013.01); *B25J 9/0006* (2013.01); *G05G 5/04* (2013.01); *G05G 2505/00* (2013.01)

(58) Field of Classification Search
CPC . B25J 9/0006; B25J 9/101; B25J 9/126; B25J 17/02; F16D 1/04
USPC .......................................... 74/490.06; 901/29
See application file for complete search history.

(56) References Cited

U.S. PATENT DOCUMENTS

| | | | | |
|---|---|---|---|---|
| 1,880,138 | A | * 9/1932 | Hubl | B25J 3/04 212/290 |
| 2012/0158174 | A1* | 6/2012 | Moon | G06N 3/008 700/245 |
| 2014/0060235 | A1* | 3/2014 | Ootani | B25J 9/101 74/490.05 |
| 2015/0135855 | A1* | 5/2015 | Mokhbery | F16D 1/0876 73/862.08 |
| 2018/0186000 | A1* | 7/2018 | Xiong | B25J 9/102 |
| 2018/0310422 | A1* | 10/2018 | Yu | B25J 19/0029 |
| 2018/0334033 | A1* | 11/2018 | Xiong | B60K 7/0007 |
| 2019/0160656 | A1* | 5/2019 | Xiong | B25J 15/0009 |

FOREIGN PATENT DOCUMENTS

| | | | | |
|---|---|---|---|---|
| CN | 205928677 | U | 2/2017 | |
| CN | 206085075 | U * | 4/2017 | .............. B25J 11/00 |
| CN | 106828652 | A * | 6/2017 | .............. B25J 17/00 |
| CN | 108597350 | A * | 9/2018 | .............. G09B 25/02 |

* cited by examiner

*Primary Examiner* — Joseph Brown (57) ABSTRACT

An assembly for driving a waist of a humanoid robot to rotate with respect to a chest of the humanoid robot includes a support assembly fixed in the chest, a servo mounted to the support assembly, and a rotating member fixed to the waist and rotatable when driven by the servo.

9 Claims, 9 Drawing Sheets

ASSEMBLY FOR DRIVING WAIST OF ROBOT AND ROBOT HAVING THE SAME

CROSS REFERENCE TO RELATED APPLICATIONS

This application claims priority to Chinese Patent Application No. 201811512103.0, filed Dec. 11, 2018, which is hereby incorporated by reference herein as if set forth in its entirety.

BACKGROUND

1. Technical Field

The present disclosure generally relates to robots, and particularly to a waist structure and a humanoid robot including the waist structure.

2. Description of Related Art

Some conventional humanoid robots usually include a servo at the waist to drive the waist to rotate. It is always useful and desirable to provide a robot having a new waist structure.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Referring to FIGS. 1-9, in one embodiment, an assembly 1000 for driving a waist 200 of a humanoid robot to rotate with respect to a chest 100 of the humanoid robot includes a support assembly 10 fixed in the chest 100, a servo 20 mounted to the support assembly 10, and a rotating member 30 fixed to the waist 200 and rotatable when driven by the servo 20. In the embodiment, the rotating member 30 as well as the lower portion of the robot, which includes the waist 200, two legs and two feet, stays stationary with respect to the surface (e.g. floor) where the robot stands when the servo 20 operates. The chest 100 thus rotate together with the rotating member 30 with respect to the waist 200.

With such configuration, the assembly 1000 can drive the chest 100 to rotate with respect to the waist 200, which enable the robot to imitate the waist twisting of a human. The assembly 1000 is simple in structure.

The servo 20 is electrically connected to a main control processor of the robot, and is controlled to rotate for a specific angle according to a command from the processor, thereby realizing the relative rotation of the upper body with respect to the lower body of the robot, thereby realizing the imitation of waist twisting of a human.

The support assembly 10 is arranged within the space defined by a front casing 41 and a rear casing 42. The rotating member 30 is arranged within the space defined by a front housing 41 and a rear housing 42.

Figure 4:
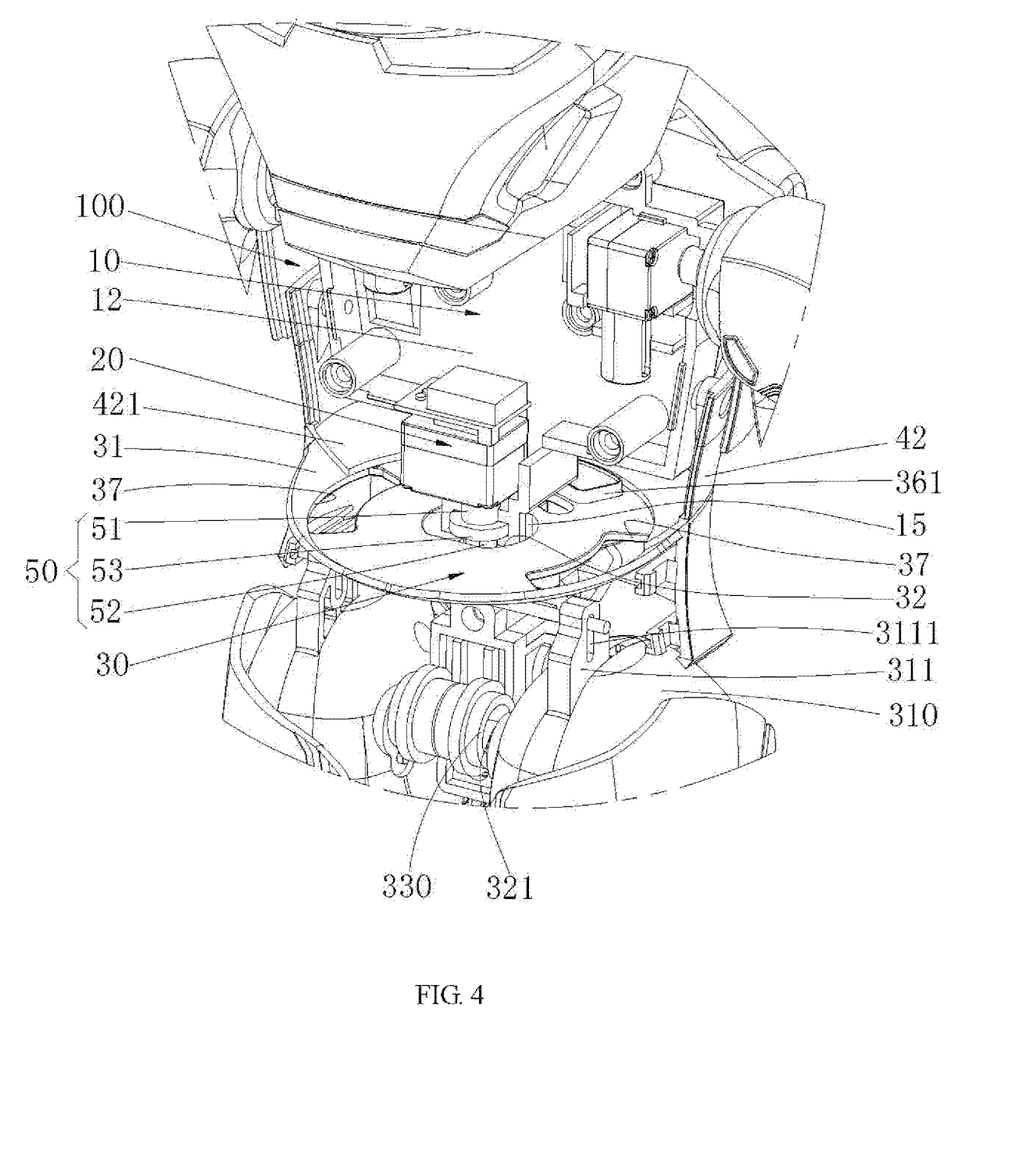
FIG. 4 is an isometric partial view of the robot of FIG. 1 with a front housing omitted for clarity.
Figure 7:
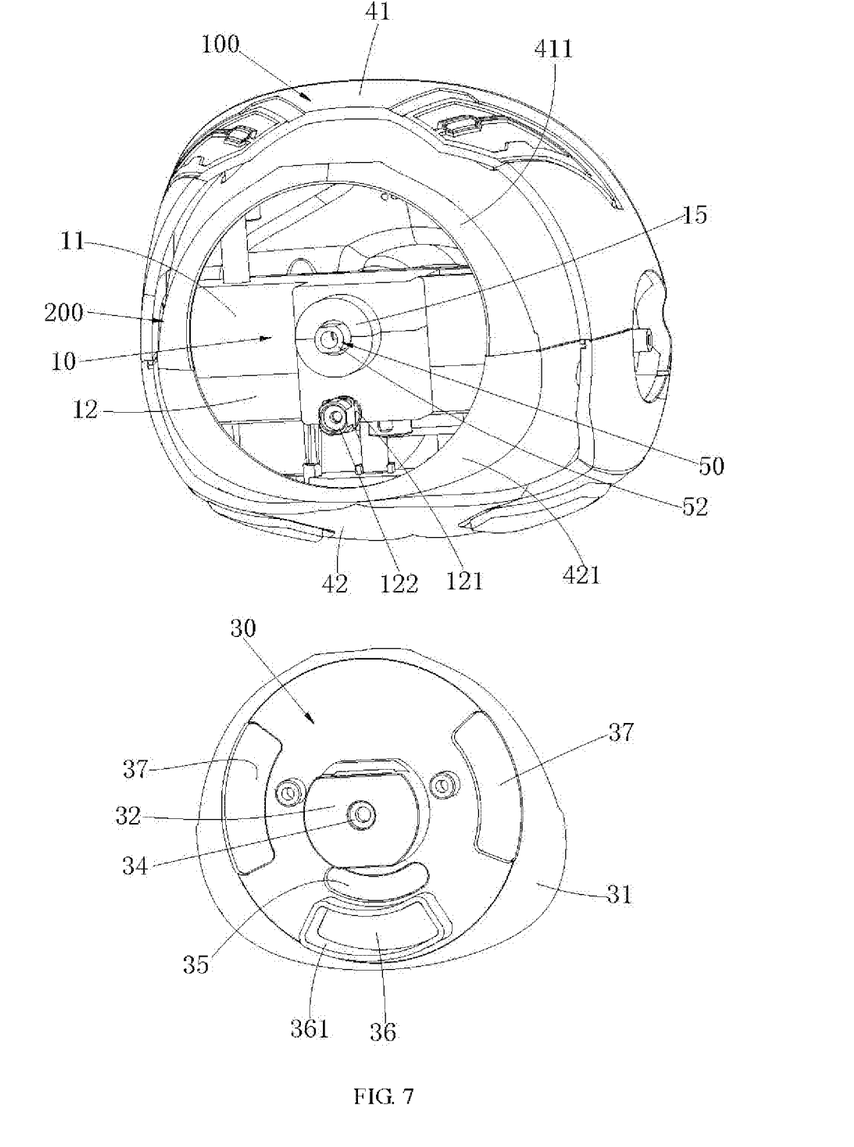
FIG. 7 is similar to FIG. 6, with a rotating member detached from the assembly of FIG. 6.
Figure 8:
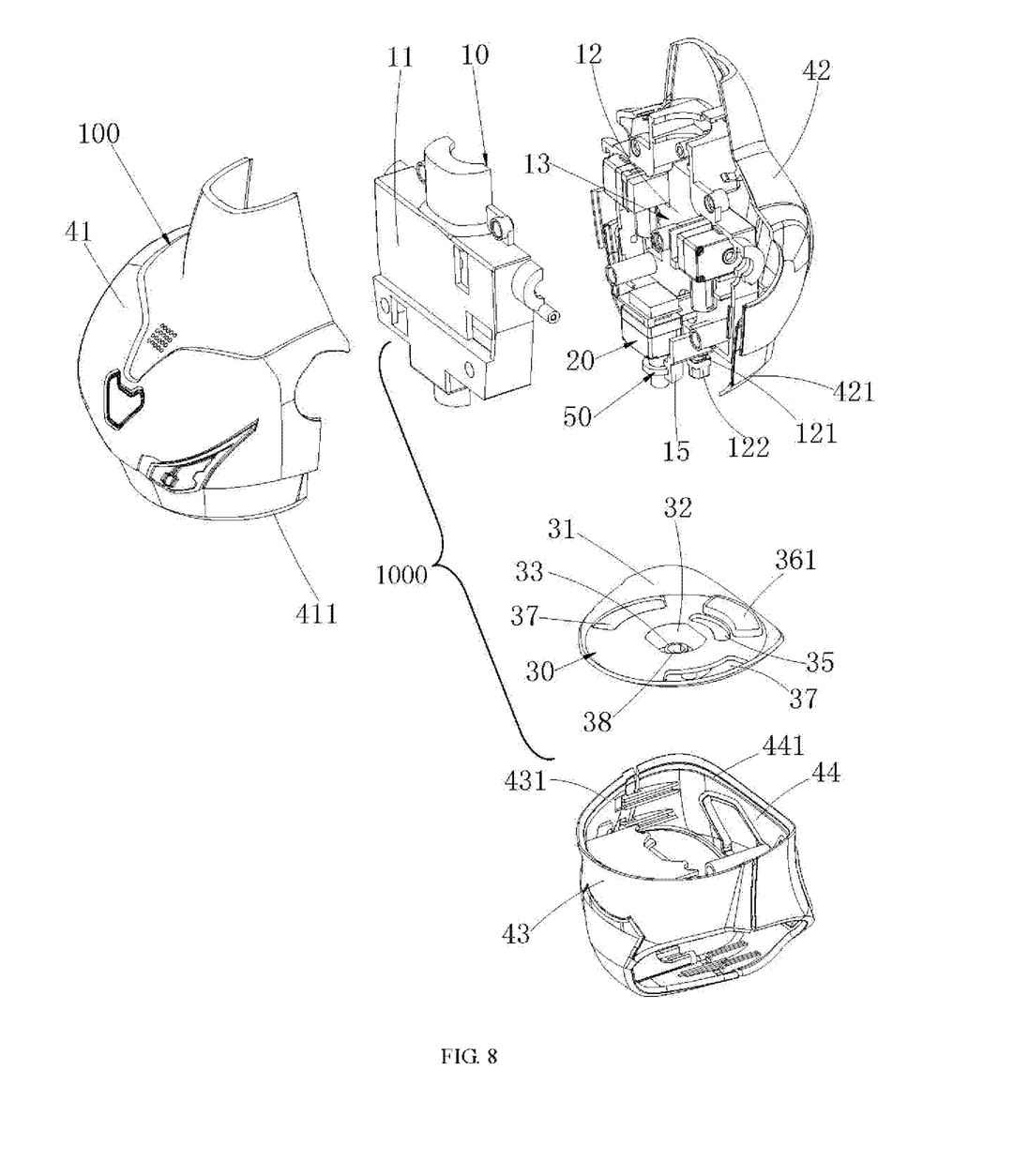
FIG. 8 is an isometric exploded view of the waist of FIG. 6.

Referring to FIGS. 4, 7 and 8, in one embodiment, an annular wall 31 obliquely extend outwardly from the edge of the rotating member 30. A matching wall 411/421 obliquely extend inward from the lower opening of the front casing 41 and the rear casing 42. The matching walls are aligned. When the fixing frame 10 is rotated relative to the rotating member 30, the annular wall 31 cooperates with the mating wall 411 (421) to allow the body front case 41 to be behind the body. In the embodiment, the matching walls 411 and 421 are semi-circular. The inner surface of the annular wall 31 contact the outer surfaces of the matching walls 411 and 421, which allows the front casing 411 and the rear casing 421 to stably rotate with respect to the rotating member 30. Recesses 431/441 are respectively defined in the front housing 43 and the rear housing 44 adjacent to an upper opening thereof. The upper end of the wall 31 is receive in the recesses 431 and 441, which prevents the rotating member 30 from moving out of the upper openings of the front housings 43 and 44.

Referring to FIGS. 2-3 and 8-9, in one embodiment, the support assembly 10 includes a front case 11 and a rear case 12 that corporately define a mounting space 13 to receive the servo 20 and/or other components therein. The support assembly 10 includes a mounting portion 14 where the servo 20 is mounted. In the embodiment, the mounting portion 14 defines a recess that is shaped and sized according to the servo 20 so as to fit the servo 20 therein. The front case 11 and the rear case 12 are connected to each other by fasteners.

Referring to FIGS. 3-4 and 8-9, in one embodiment, the assembly 1000 further includes a connecting member 50. The servo 20 includes an output shaft 21 coaxially connected to the rotating member 30 via the connecting member 50. Motion from the output shaft 21 can be transmitted to the rotating member 30 through the connecting member 50.

In one embodiment, the connecting member 50 includes a first shaft 51, a second shaft 52 and a limiting portion 53 located between and connected to the first shaft 51 and the second shaft 52. The first shaft 51 is coaxially connected to the output shaft 21 of the servo 20. The second shaft 52 is coaxially connected to the rotating member 30. The support assembly 10 defines a receiving groove 151a to receive the limiting portion 53 therein so as to hold the limiting portion 53 in position, which prevents axial movement of the limiting portion 53. The limiting portion 53 is rotatable in the receiving groove 151a.

In one embodiment, the first shaft and the output shaft of the servo, as well as the second shaft and the rotating member, are connected to each other by profile shaft connection that is a connection technique that uses a shaft and a shaft hole both having non-circular cross section. In the embodiment, the first shaft 51 defines a non-circular hole in one end thereof. The output shaft 21 of the servo 20 includes a non-circular portion at one end thereof, which is shaped and sized according to the non-circular hole of the first shaft 51. The non-circular portion of the output shaft 21 is fit in the non-circular hole of the first shaft 51, which allows the first shaft 51 to rotate together with the output shaft 21. As is the case with the first, shaft 51 and the output shaft 21, the second shaft 52 has a non-circular portion and the rotating member 30 defines a non-circular hole 38.

Referring to FIGS. 3-4 and 7-9, in one embodiment, the mounting portion 14 is located at lower ends of the front case 11 and the rear case 12. A protruding portion 15 protrude from the lower ends of the mounting portion 14. The protruding portion 15 defines a receiving hole 151 to receive the connecting member 50. The receiving groove 151a is defined in the inner lateral surface of the receiving hole 151. The rotating member 50 include a protrusion 32 at the lower end facing away from the servo 20. The protrusion 32 defines a space to receive the protruding portion 15, which can facilitate the reduction of the overall size of the structure in vertical direction. A projection portion 33 protrudes from the bottom surface of the space. The non-circular hole 38 is defined in a top end of the projection portion 33. The protrusion 32 defines a hole 34 in communication with the non-circular hole 38. The hole 34 and the non-circular hole 38 allow a tool to pass therethrough so as to push the connecting member 50 to detach the connecting member 50.

Figure 1:
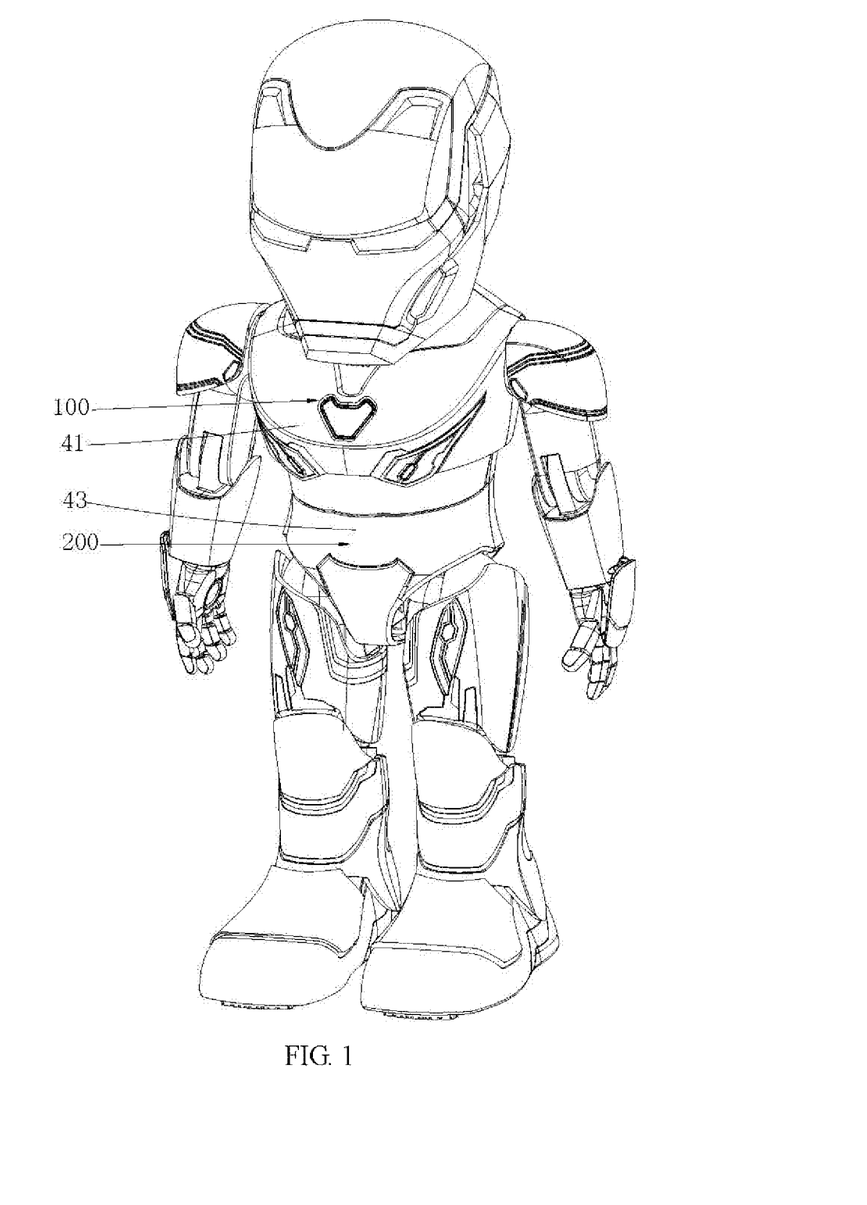
FIG. 1 is an isometric view of a humanoid robot according to one embodiment.
Figure 2:
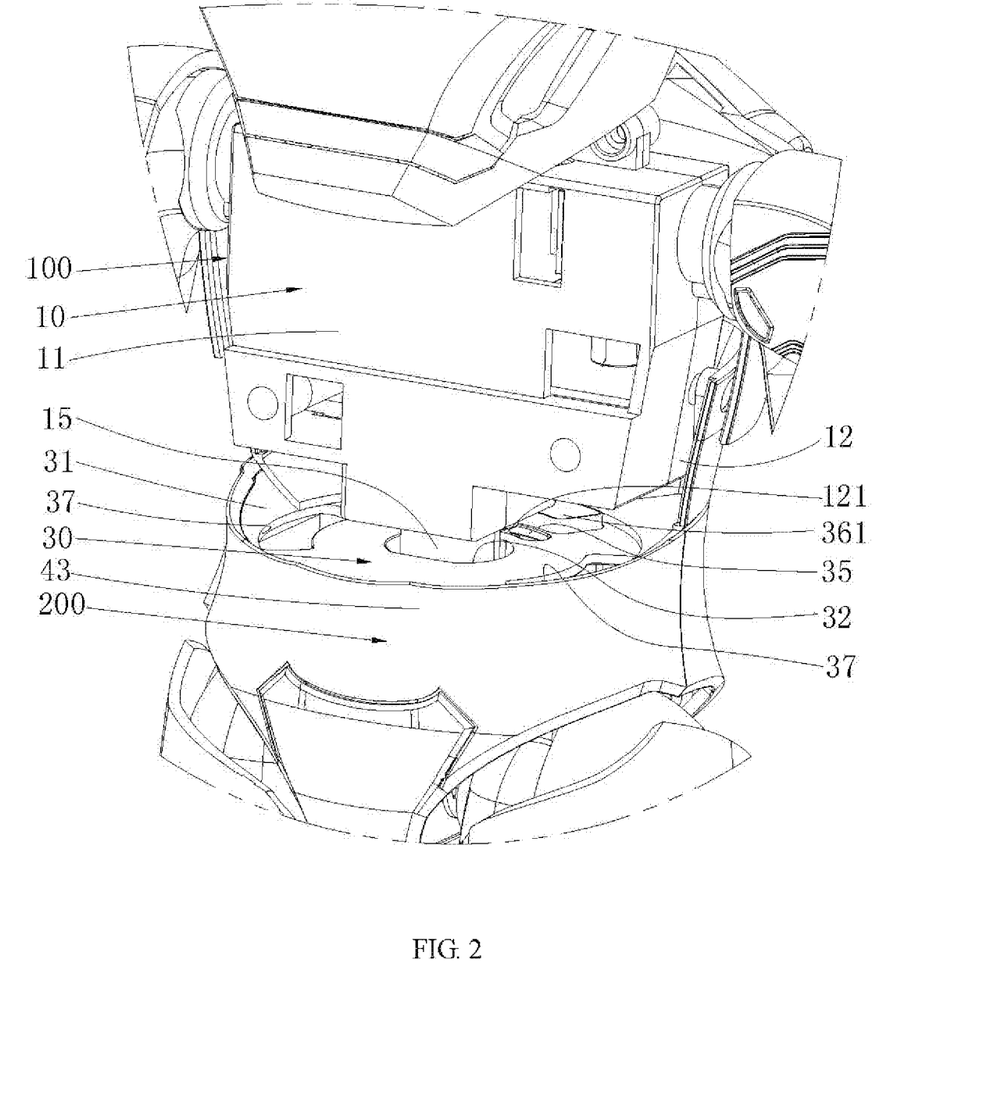
FIG. 2 is an isometric partial view of the robot of FIG. 1 with a front casing omitted for clarity.
Figure 3:
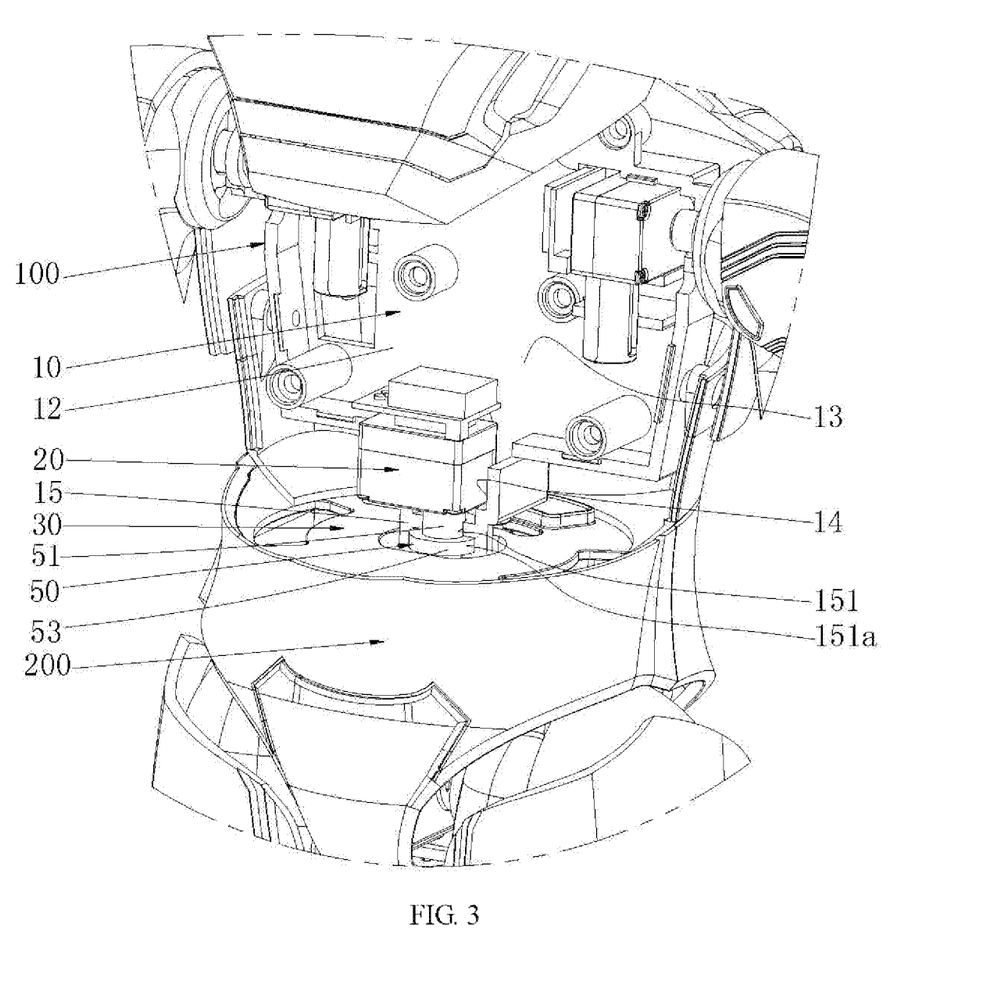
FIG. 3 is an isometric partial view of the robot of FIG. 1 with a front case omitted for clarity.
Figure 6:
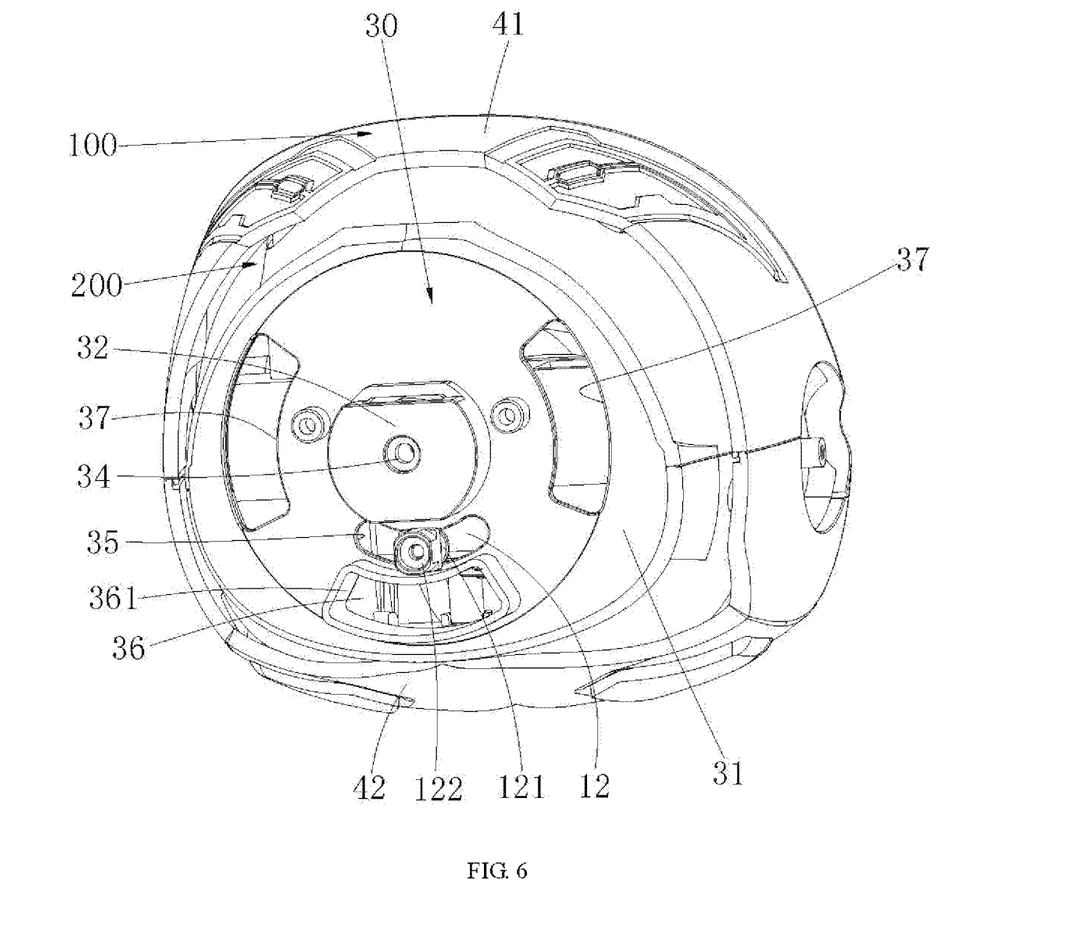
FIG. 6 is an isometric view of a waist of the robot of FIG. 1.
Figure 9:
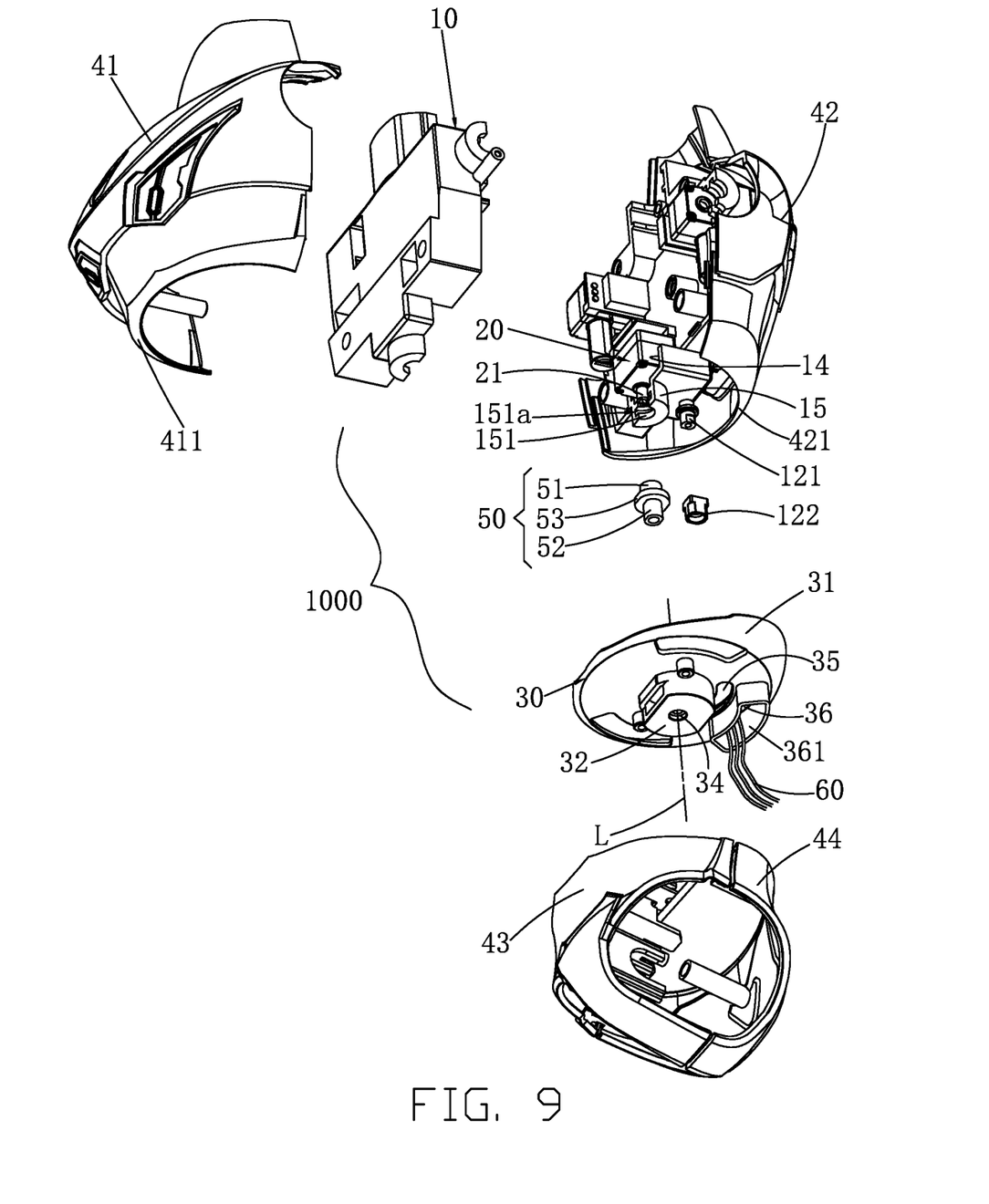
FIG. 9 is similar to FIG. 8, viewed from another perspective.

Referring to FIGS. 2, 6 and 9, in one embodiment, the support assembly 10 includes a post 121, and the rotating member 30 defines a groove 35 having two ends. The post 121 works with the groove 35 to define a rotational range of the support assembly 10. The post is movable within the groove 35, and rotation of the rotating member 30 is stopped when the post 121 comes into contact with either of the two ends. The post 121 is arranged at the rear case 12 to facilitate the arrangement of other components at the front.

In one embodiment, a limiting block 122 is connected to an end of the post 121 and used to prevent the post 121 from moving out of the groove 35. The limiting block 122 has a size greater than the width of the groove 35. The limiting block 122 can facilitate a stable relative rotation of the waist 200 with respect to the chest 100.

In one embodiment, the rotating member 30 defines a through hole 36 through which cables of the robot pass. That is, cables in the lower portion of the robot can pass through the through hole 36 and then extends into the upper portion of the robot. A wall 361 extends along the edge of the through hole 36 and is used to protect the cables passing through the through hole 36. In one embodiment, the through hole 36 is disposed away from an axis L about which the rotating member 30 rotates.

Figure 5:
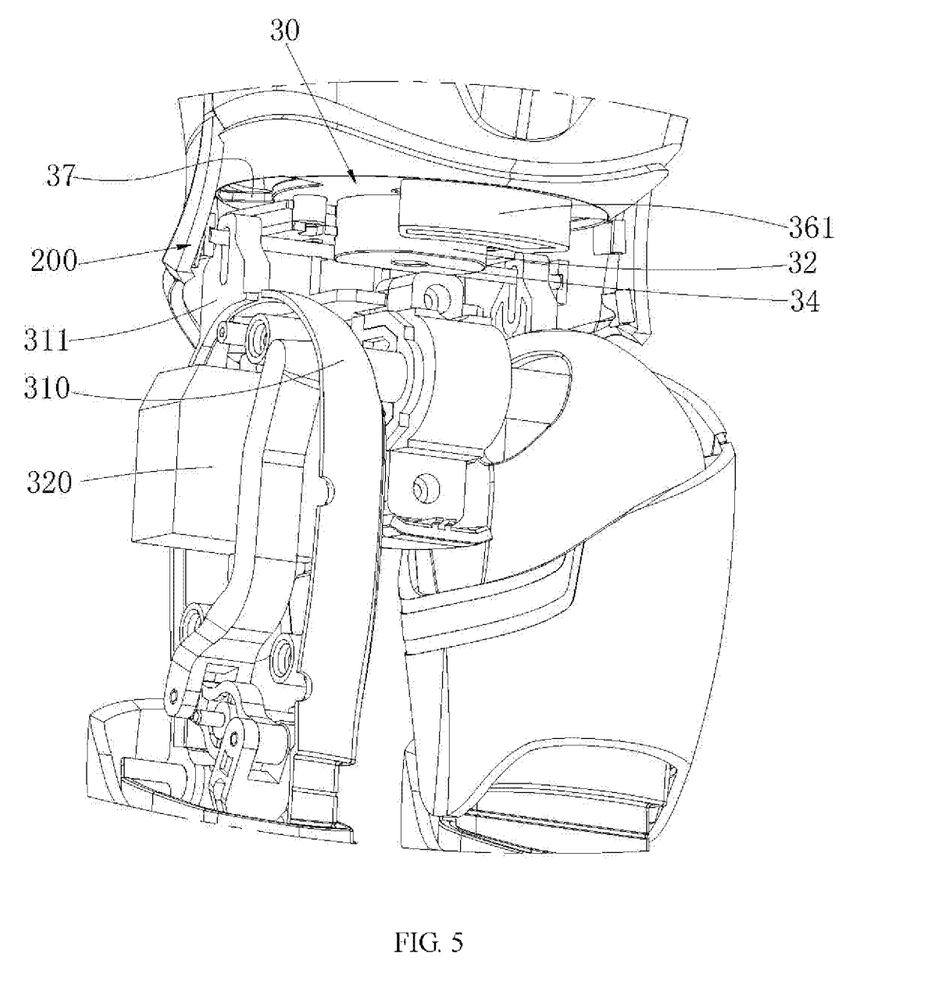
FIG. 5 is an isometric partial view of the robot of FIG. 1 with an outer casing of a leg and a rear housing omitted for clarity.

Referring to FIGS. 4 and 5, in one embodiment, the rotating member 30 defines two orifices 37 to prevent interference of the rotating member 30 with legs of the robot. Each leg includes an outer casing 310, a servo 320 and a rotating member 330. The outer casing 310 includes a tab 311 defining a sliding groove 3111. An output shaft 321 of the servo 320 is fixed to the rotating member 330 and offset from the center axis thereof. The rotating member 330 is located within the waist 200. The servo 320 executes a motion command from the main control processor, and the output shall 321 then rotates and drives the rotating member 330 to rotate. The legs are then driven to move, with their upper ends moving up and down during the movement of the legs. The orifices 37 allow the top ends of the tabs 311 to pass therethrough so as to prevent the tabs 311 from bumping into rotating member 30.

Referring to FIGS. 1-4, a robot according to an embodiment includes an assembly for driving a waist of the robot to rotate with respect to a chest of the robot, as described above. With such configuration, the assembly can drive the chest 100 to rotate with respect to the waist 200, which enable the robot to imitate the waist twisting of a human. The assembly is simple in structure.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. An assembly for driving a waist of a humanoid robot to rotate with respect to a chest of the humanoid robot, the assembly comprising:
   a support assembly fixed in the chest;
   a servo mounted to the support assembly;
   a rotating member fixed to the waist and rotatable when driven by the servo; and
   a connecting member;
   wherein the servo comprises an output shaft coaxially connected to the rotating member via the connecting member;
   wherein the connecting member comprises a first shaft, a second shaft and a limiting portion located between and connected to the first shaft and the second shaft, the first shaft is coaxially connected to the output shaft of the servo, the second shaft is coaxially connected to the rotating member, and the support assembly defines a receiving groove having upper and lower sides and configured to receive the limiting portion therein so as to prevent axial movement of the limiting portion.

2. The assembly of claim 1, wherein the support assembly comprises a front case and a rear case connected to the front case, the front case and the rear case corporately define a mounting space, and the servo is located in the mounting space.

3. The assembly of claim 1, wherein the first shaft and the output shaft of the servo, as well as the second shaft and the rotating member, are connected to each other by a profile shaft connection.

4. The assembly of claim 1, wherein the support assembly comprises a post, and the rotating member defines a groove having two ends, the post is movable within the groove, and rotation of the rotating member is stopped when the post comes into contact with either of the two ends.

5. The assembly of claim 1, wherein the rotating member defines a through hole through which cables of the robot pass, the through hole is disposed away from an axis about which the rotating member rotates.

6. The assembly of claim 1, wherein the rotating member defines two orifices to prevent interference of the rotating member with legs of the robot.

7. A robot comprising a chest, a waist, and an assembly for driving the waist to rotate with respect to the chest, the assembly comprising:
- a support assembly fixed in the chest;
- a servo mounted to the support assembly;
- a rotating member fixed to the waist and rotatable when driven by the servo; and
- a connecting member;
- wherein the servo comprises an output shaft coaxially connected to the rotating member via the connecting member;
- wherein the connecting member comprises a first shaft, a second shaft and a limiting portion located between and connected to the first shaft and the second shaft, the first shaft is coaxially connected to the output shaft of the servo, the second shaft is coaxially connected to the rotating member, and the support assembly defines a receiving groove having upper and lower sides and configured to receive the limiting portion therein so as to prevent axial movement of the limiting portion.

8. The robot of claim 7, wherein the rotating member defines a through hole through which cables of the robot pass, and the through hole is disposed away from an axis about which the rotating member rotates.

9. The robot of claim 7, wherein the support assembly comprises a post, and the rotating member defines a groove having two ends, the post extends through and is movable within the groove, and rotation of the rotating member is stopped when the post comes into contact with either of the two ends.

* * * * *